United States Patent [19]
Grove et al.

[11] 3,978,707
[45] Sept. 7, 1976

[54] FLOW CONTROL APPARATUS AND SYSTEM

[75] Inventors: Marvin H. Grove, Houston; Ronald G. Dunegan, Katy, both of Tex.

[73] Assignee: M & J Valve Company, Houston, Tex.

[22] Filed: Feb. 12, 1975

[21] Appl. No.: 549,180

[52] U.S. Cl. .................. 73/3; 137/312; 137/625.42; 137/625.48
[51] Int. Cl.² .......................... G01F 25/00
[58] Field of Search .......... 137/312, 625.42, 625.48, 137/625.68; 73/3

[56] References Cited
UNITED STATES PATENTS

| | | | |
|---|---|---|---|
| 2,542,390 | 2/1951 | Brown | 137/625.48 |
| 2,896,662 | 7/1959 | Thomas | 137/625.48 X |
| 3,162,210 | 12/1964 | Bemis | 137/625.48 UX |
| 3,545,479 | 12/1970 | Loe | 137/625.68 X |
| 3,827,285 | 8/1974 | Grove | 137/312 X |

Primary Examiner—Arnold Rosenthal
Attorney, Agent, or Firm—Flehr, Hohbach, Test, Albritton & Herbert

[57] ABSTRACT

Flow control apparatus of the type having more than two flow passages in the body and having means within the body including a plurality of sealing assemblies which are positioned to control or divert fluid flow in a desired manner. The apparatus is featured by use of means which connects and guides certain of the sealing assemblies and which provides a fluid passage extending longitudinally through the body. Also systems making use of such apparatus, particularly metering systems. Such systems make use of the flow control apparatus in such a manner as to reduce vertical space requirements and simplify manifolding.

5 Claims, 4 Drawing Figures

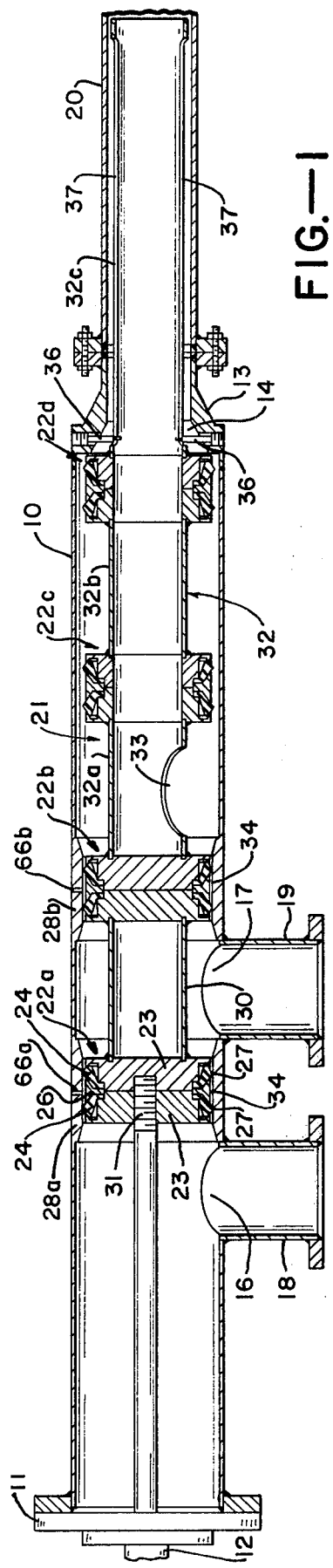
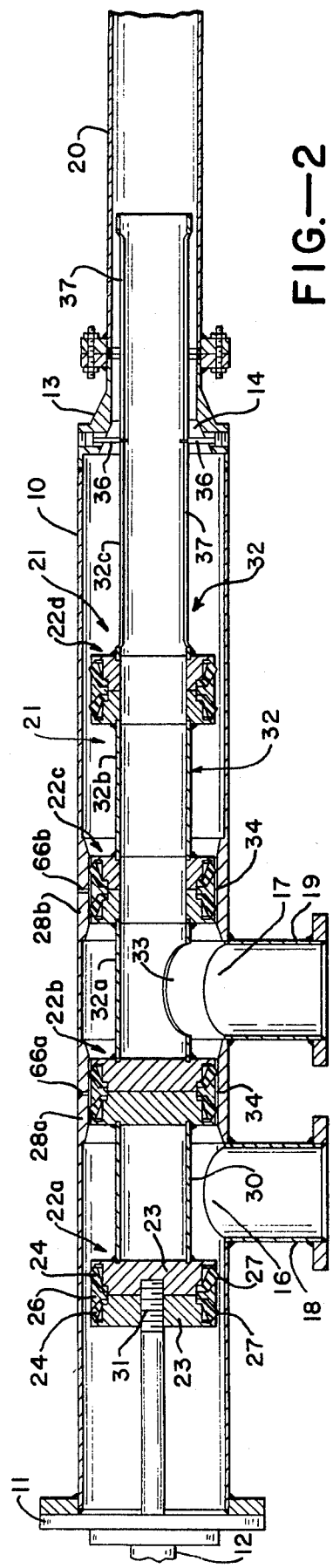
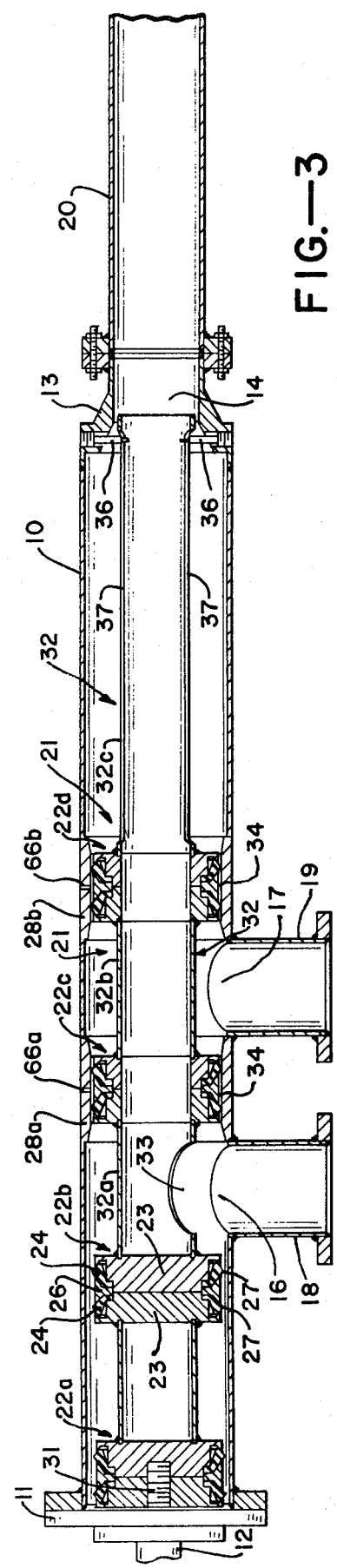

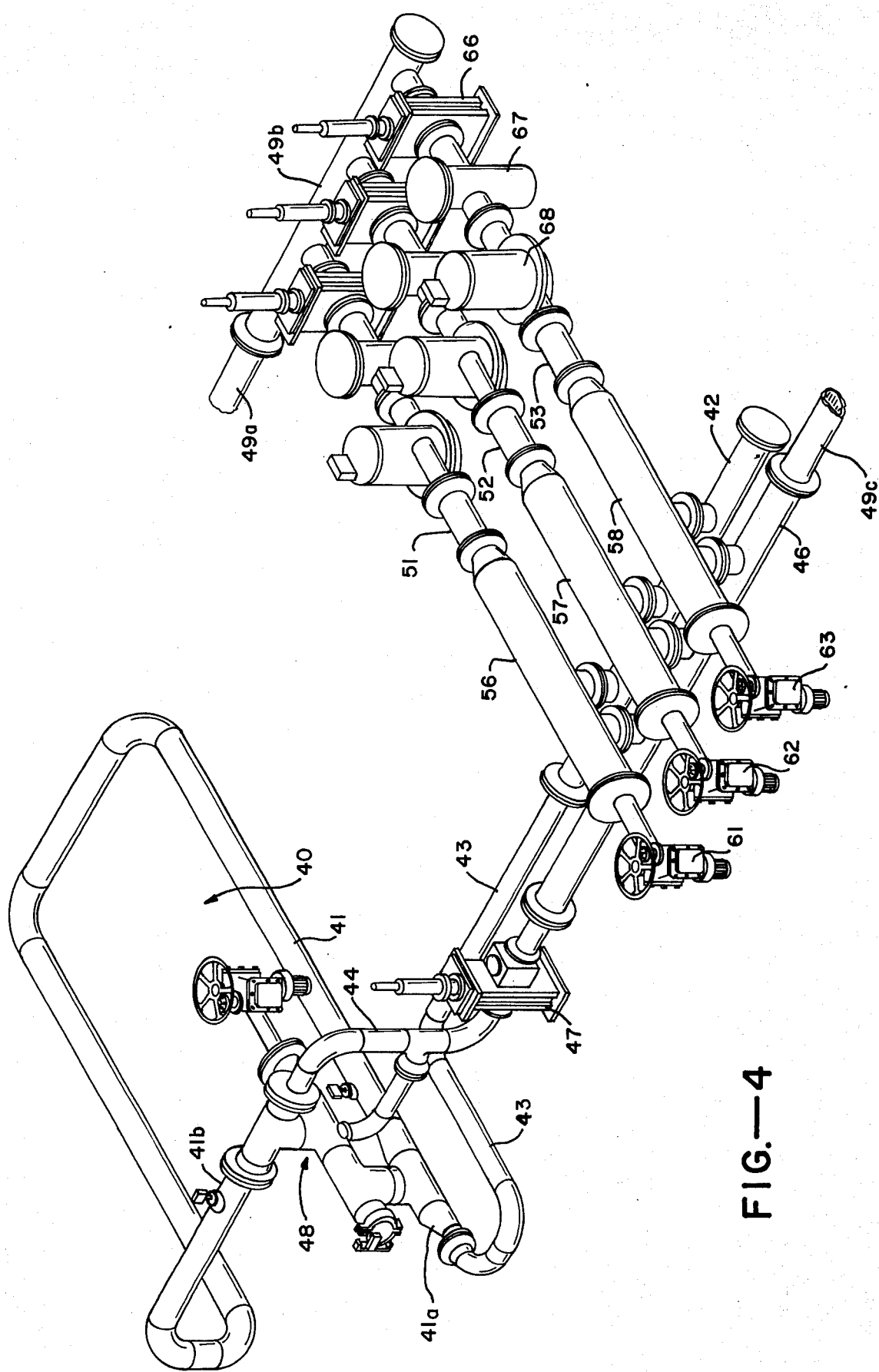
FIG.—4

FLOW CONTROL APPARATUS AND SYSTEM

BACKGROUND OF THE INVENTION

This invention relates generally to fluid flow control apparatus or so-called diverters, which are useful for directing the flow of fluids in fluid distribution systems. The invention also relates to such fluid distribution systems and particularly to systems incorporating meter provers.

Copending application Ser. No. 350,820 filed Apr. 13, 1973, now U.S. Pat. No. 3,860,033 dated Jan. 14, 1975, discloses a flow control apparatus or flow diverter which has more than two fluid passages in the body for communicating with associated piping or manifolding, together with means which can be shifted to a plurality of operating positions to control fluid flow in a particular manner. The flow control passages are so located that when a plurality of the diverters are employed in liquid flow distribution systems, such as one incorporating a meter prover, the diverters are interposed between the meter runs and the prover and discharge manifolds, and are mounted vertically. This greatly increases space requirements and dictates location of the associated manifolds in vertical spaced relationship.

Both U.S. Pat. No. 3,860,033 and U.S. Pat. No. 3,827,285 dated Aug. 6, 1974 disclose the use of sealing assemblies of the double cup type which have been proven to be effective in providing adequate sealing. Also as disclosed in said U.S. Pat. No. 3,827,285, such assemblies make possible simple means to detect leakage past the sealing assembly which employs the pressure differential induced when the assembly is moved into a cooperating cylindrical sleeve to arrest fluid flow.

SUMMARY OF THE INVENTION

In general, it is an object of the invention to provide flow control apparatus or a diverter which is constructed in such a manner that its installation in various distribution systems is greatly simplified.

Another object of the invention is to provide a flow control apparatus or diverter which can be installed in distribution systems in horizontal position, thus reducing vertical space requirements.

Another object of the invention is to provide flow control apparatus which makes use of movable tube means for cooperating with the sealing assemblies, the tube means also serving to conduct fluid flow from the inlet to a selected outflow passage.

Another object is to provide flow control apparatus having more than two outflow passages for making connection with associated manifolding or piping, and with a flow control assembly within the body of the apparatus which can be moved to a plurality of operating positions to effectively distribute fluid flow in a desired manner. The flow control means within the body is so constructed that flow into the body occurs longitudinally through one end of the same, and whereby according to the operating position of the flow control means, the fluid is selectively distributed in the desired manner to a selected outflow passage, or to a position in which such flow is arrested.

Another object is to provide a flow distribution system, and particularly one incorporating a meter prover, in which a plurality of such flow control apparatuses are installed in horizontal position together with headers or manifolds and horizontal meter runs.

In general, the flow control apparatus forming the present invention consists of a hollow body, the main part of which is annular in section and extended along a central longitudinal axis. The flow control means disposed within the body consists of sealing assemblies carried by the tube means and which cooperate with cylindrical sleeves carried by the body. Operating means is provided for conjointly moving the sealing assemblies between a plurality of operating positions. In one operating position, certain sealing assemblies are disposed concentric with and in sealing relationship with the cylindrical surfaces of the sleeves to arrest all fluid flow. For another operating position, certain of the sealing assemblies are disengaged from the cylindrical surfaces while other assemblies are engaged. The body is provided with outflow passages formed by spaced side openings in the body and by an inflow opening in one end of the body. The tube means has a diameter substantially less than the inner diameter of the body, with one end portion of the tube means communicating with the inflow body opening. The tube means also has an opening which establishes communication between its interior and the space between the tube means and the side walls of the body. One of the sleeves with which the sealing assemblies cooperate is located between that end of the body having the inflow opening and nearest outflow opening. Another sleeve is located between the outflow openings. For the different operating positions flow from the inflow opening and through the tube means can be distributed to either one of the two outflow openings, or such flow can be arrested. The invention also includes a system wherein a plurality of the flow control apparatuses or diverters are employed together with inflow piping, and manifolds or headers into which the fluid is selectively discharged.

Further objects and features of the invention will appear from the following description in which the preferred embodiments have been set forth in detail in conjunction with the accompanying drawing.

BRIEF DESCRIPTION OF THE DRAWING

FIG. 1 is a side elevational view in section illustrating flow control apparatus incorporating the present invention;

FIG. 2 is a view like FIG. 1 but showing the flow control means in a different operating position;

FIG. 3 is a side elevational view in section like FIG. 1, but showing the operating parts in a third operating position; and FIG. 4 illustrates a system incorporating a plurality of flow control apparatuses such as illustrated in FIGS. 1–3.

DESCRIPTION OF THE PREFERRED EMBODIMENTS

The flow control apparatus illustrated in FIGS. 1–3 consists of an elongated hollow body 10 which is annular in section. One end of the body is closed by a plate 11 which serves to mount the operating means 12. The other end of the body is provided with a reducing or transition portion 13 which provides the inflow passage 14.

One side of the main part of the body 10 is provided with the openings 16 and 17 which form spaced outflow passages, and which connect with short pipe sections or hubs 18 and 19, adapted to be coupled to associated piping or manifolding. The end of the body which provides passage 14 is shown coupled to inflow pipe 20.

The flow control means 21 located within the body consists of sealing assemblies 22a, 22b, 22c and 22d. These assemblies can be constructed as disclosed in copending application Ser. No. 545,765, filed Jan. 31, 1975, a continuation-in-part of Ser. No. 400,790 filed Sept. 26, 1973 now abandoned. Each assembly consists of plates 23 that are circular in configuration and which serve to mount the oppositely faced sealing cups 24 made of resilient material (e.g., synthetic rubber or elastomer). A central annulus 26 is interposed between the sealing cups 24, and the entire assembly is clamped together as by bolts (not shown) whereby the base portions of the sealing cups are clamped between adjacent clamping faces of the members 23 and 26. The rim or flange portions of the cups provide exterior annular sealing areas 27.

The body 10 is constructed to provide the cylindrical sleeves 28a and 28b which are spaced longitudinally. Sleeve 28a is interposed between the outflow passages 16 and 17, whereas sleeve 28b is interposed between outflow passage 17 and the inflow passage 14.

The sealing assemblies 22a and 22b are rigidly connected together by the strut means 30. This can be in the form of a tube 30 which is secured to the adjacent member 23 of each of the assemblies 22a and 22b, as by welding. Also an operating rod or stem 31 is secured to the assembly 22a and extends outwardly to the operator 12.

The assemblies 22b, 22c and 22d are secured together and to assembly 22a by the aligned tube sections 32a, 32b and 32c of the tube means 32. The tube section 32a is secured as by welding to the assemblies 22b and 22c. Tube section 32b is secured to assemblies 22c and 22d and section 32c is secured to assembly 22d. The length of section 32c is such that it extends into the inflow opening 14 at the end of the body for a distance depending upon the position of the sealing assemblies. Also that end of the tube section 32b which is nearest the assembly 22b is provided with the side opening 33 through which flow may occur. This opening communicates with the space within the tube means 32 and the space surrounding the tube 32 is within the body. Each assembly 22c and 22d is made annular to provide a flow passage through the same.

The sleeves 28a and 28b provide cylindrical inner surfaces 34 which are adapted to have sealing engagement with the resilient sealing cups 24 of the sealing assemblies. When a sealing assembly is not within one of the sleeves, the diameter of the sealing areas 27 is substantially greater than the diameter of the cylindrical surfaces 34. However, when a sealing assembly is shifted to a position within one of the sleeves, the resilient sealing members are contracted and the areas 27 caused to be in sealing engagement with the cylindrical surfaces 34, thus arresting any fluid flow through the sleeve.

In instances where the operator 12 is constructed in such a manner that it tends to apply some turning torque to the operating rod 31 when the apparatus is being operated, means can be incorporated in the apparatus to prevent any turning of the inner assembly. This means can consist of guide pins 36 carried by the body and having inner ends of reduced diameter which extend into longitudinal slots 37 provided on diametrically opposite sides of the tube 32.

Operation of the above apparatus is as follows. When the sealing assemblies 22a, 22b, 22c and 22d are in the position shown in FIG. 1, the assemblies 22a and 22b are within the sleeves 28a and 28b, and fluid cannot flow from the inlet passage 14 to either one of the flow passages 16 or 17. Likewise, no flow of fluid can occur between the flow passages 16 and 17. When the sealing assemblies are moved to the second operating position shown in FIG. 2, the assemblies 22b and 22c are located within the sleeves 28a and 28b, with the result that communication is again interrupted between the flow passages 16 and 17, but flow may occur from the inflow passsage 14 through the tube sections 32a, 32b and 32c, and opening 33 to the passage 17. When the sealing assemblies are moved to the third position shown in FIG. 3, flow between passages 16 and 17 is again interrupted by virtue of the assembly 22c being within the sleeve 28a, and flow may occur from the inlet passage 14 and opening 33 to the flow passage 16. Thus flow from the passage 14 or pipe 20 can be diverted to either one of the two flow passages 16 or 17, and for either of these two positions communication between the flow passages 16 and 17 is interrupted. Likewise, the sealing assemblies can be positioned to the limiting position shown in FIG. 1 for the purpose of interrupting flow from the inlet passage 14 or pipe 20, while preventing any communication between the flow passages 16 and 17.

For the movements of the sealing assemblies described above, the open end of the tube 32c extends varying distances through the inlet opening 14 and into the inlet pipe 20. This serves to guide the tube 32c to maintain it in alignment with the central axis of the body, while at the same time making it unnecessary to provide a body of sufficient length to enclose the tube 32c for all operating positions. In addition, the tube permits straight flow from the inlet pipe 20 through the main part of the body, with the flow being diverted into either one of the other of the flow passages 16 or 17, or with all flow interrupted for the position shown in FIG. 1.

FIG. 4 illustrates a liquid metering system making use of diverters, as shown in FIGS. 1–3. The system includes a liquid flow meter prover 40 of the unidirectional type consisting of the metering pipe loop 41 having its inlet end portion 41a connected to the header 42 by pipe 43. The outlet end portion 41b of the metering pipe is connected by pipe 44 to the header 46, and includes the gate valve 47. The inlet and outlet ends of the meter prover pipe are also interconnected by the interchange 48 which serves to receive a flow propelled sphere after a meter proving run and to launch the sphere into the inlet end portion 41a when a meter proving run is commenced. It also serves as a seal between the inlet and outlet ends of the metering pipe during a proving run. Various types of interchanges can be used for this purpose, as for example the one disclosed and claimed in U.S. application Ser. No. 331,252, filed Feb. 9, 1973, in the joint names of M. H. Grove and R. G. Dunegan.

The upstream portion 49a of the main line is connected to the header 49b which in turn connects with the several parallel metering runs 51, 52 and 53. A plurality of flow control apparatuses or diverters 56, 57 and 58, constructed as illustrated in FIGS. 1–3, are connected to the outlet ends of the meter runs 51, 52 and 53, with the diverters together with the meter runs being extended horizontally. More specifically, the inflow passage 14 of each diverter is coupled to the outlet end of one of the meter runs, while the outflow openings 16 and 17 and the corresponding hubs 18 and 19 are directly connected respectively to the manifolds 46 and 42. It will be noted that the manifolds 46 and 42 are disposed horizontally directly below the diverters 56, 57 and 58, and are on the same level. The operating rod of each of the diverters is connected to the exterior power operators 61, 62 and 63, which may be of the electrical motor type provided with emergency manual operating means. The meter runs may be identical, with each run consisting of a shut-off valve 66, a strainer 67, and a flow meter 68. The discharge header 46 connects to the downstream portion 49c of the main line.

The system of FIG. 4 operates as follows. When the meter prover is not in use and valve 47 is closed, one or more of the gate valves 66 are open to meter the flow. Under such conditions the diverters corresponding to the meter runs being used are positioned as shown in FIG. 3 whereby flow is diverted into the discharge header 46 and the downstream portion 49c of the main line. If it is desired to check the accuracy of any of the meters 68 or to effect accurate calibration of the meter readings, valve 47 is opened and the diverter corresponding to the meter to be calibrated is shifted to the position shown in FIG. 2. This diverts the flow occurring through the meter run into the prover header 42 and from thence, the flow occurs through the metering pipe 41 and through the pipe 44, valve 47, and header 46 to the downstream main line portion 49c. During the meter proving run, the remainder of the diverters are positioned as shown in FIG. 3, whereby flow is passing through the other meters connected to the header 49b. If it is desired to work on equipment in a particular meter run, as for example to service or repair a strainer or meter, the run can be isolated by closing the corresponding inlet valve 66 and moving the corresponding diverter to the position shown in FIG. 1. Then this meter run is completely isolated from the upstream and downstream portions 49a and 49c of the main line and also from the meter prover.

It will be evident from the mode of operation described above that diverters constructed as shown in FIGS. 1–3 provide simple and effective means for systems such as are required for use with liquid meter provers. Installation requirements of such a system are greatly simplified, particularly since the diverters permit installation horizontally in direct alignment with the meter runs. Likewise the construction of the diverters permits the headers to extend directly below the diverters for direct connection. It will be evident that the vertical space requirements for such a system are greatly reduced over prior arrangements which mounted the diverters vertically.

In FIGS. 1–3, ducts 66a and 67b are shown extending from the interior of sleeves 28a and 28b to the exterior. Such ducts can be connected to pressure responsive means to detect leakage, as disclosed in U.S. Pat. No. 3,827,285.

What is claimed is:

1. In flow control apparatus or diverter, a hollow body having its main part annular in section and extended along a central longitudinal axis, flow control means disposed within the body, said flow control means including four sealing assemblies in axial alignment and in spaced relationship (hereinafter termed first, second, third and fourth assemblies in the order at which they are disposed with the fourth assembly nearer the inflow opening), an opening forming an inflow passage at one end of the body and concentric with said axis, the sides of the body having openings forming longitudinally spaced outflow passages, two longitudinally spaced cylindrical sleeves carried by the body, one of the sleeves being located between the outflow passages and the other sleeve being disposed adjacent that outflow passage which is nearest the inflow opening and between such outflow passage and the inflow passage, means for mechanically connecting all of the sealing assemblies in spaced relationship for conjoint reciprocation within the body with the spacing between successive pairs of assemblies being equal and substantially the same as the spacing between the sleeves, said means comprising tube means aligned with said axis and having a diameter substantially less than the internal diameters of the sleeves and the body, one end of the tube means being in communication with the inflow passage, the portions of the tube means extending between the fourth and third assemblies and also between the second and first assemblies being imperforate and that portion extending between the second and third assemblies being perforate, an operating rod connected to move all of the assemblies to any one of three operating positions, the positional relationship of the four sealing assemblies and the two sleeves being such that for a first operating position fluid flow from the inflow passage is prevented from flowing to either one of the outflow passages by engagement of the first and second assemblies with the sleeves and the outflow passages are isolated from each other, and whereby in a second operating position the second and third sealing assemblies are in sealing engagement with said sleeves whereby flow can occur from the inflow passage to one of the outflow passages and the outflow passages isolated from each other, and whereby in a third position the third and fourth sealing assemblies are in sealing engagement with said sleeves whereby flow may occur from the inflow passage to the second one of the outflow passages and the outflow passages again isolated from each other.

2. Apparatus as in claim 1 in which the third and fourth assemblies have openings therethrough in communication with the tube means, that portion of the tube means extending between the second and third sealing assemblies being in communication with the space between the tube means and the body.

3. A system comprising a plurality of apparatuses or diverters as defined in claim 1, together with two headers connected to corresponding outflow passages of the diverters.

4. A meter proving system comprising a plurality of apparatuses or diverters as defined in claim 1, a plurality of horizontal meter runs adapted to be connected to the upstream side of a main liquid flow line, the diverters being disposed horizontally with each diverter in alignment with its corresponding meter run, a meter prover header and a discharge header disposed horizontally and connected to corresponding outflow passages of the diverters, a meter prover having a metering loop and piping serving to connect the headers to the end portions of the metering loop.

5. Apparatus as in claim 1 in which certain of the sealing assemblies are annular and in which tube means rigidly connects the assemblies in alignment for conjoint movement, flow through the inflow passage being directed through the tube means and the annular assemblies.

* * * * *